United States Patent [19]
Mueller et al.

[11] Patent Number: 5,557,021
[45] Date of Patent: Sep. 17, 1996

[54] PHILLIPS CATALYST AND ITS USE FOR THE PREPARATION OF ETHYLENE/α-OLEFIN COPOLYMERS

[75] Inventors: Hans-Joachim Mueller, Gruenstadt; Kaspar Evertz, Schifferstadt; Siegfried Weber, Weinheim; Guido Funk, Worms 1; Rainer Konrad, Goennheim; Roland Saive, Ludwigshafen, all of Germany

[73] Assignee: BASF Aktiengesellschaft, Ludwigshafen, Germany

[21] Appl. No.: 512,556

[22] Filed: Aug. 8, 1995

Related U.S. Application Data

[62] Division of Ser. No. 247,479, May 23, 1994, Pat. No. 5,480,852, which is a continuation of Ser. No. 16,529, Feb. 11, 1993, abandoned.

[30] Foreign Application Priority Data

Feb. 13, 1992 [DE] Germany ........................... 42 04 260.7

[51] Int. Cl.$^6$ ..................................... C07C 2/24
[52] U.S. Cl. ..................... 585/513; 585/511; 585/514; 526/105; 526/139
[58] Field of Search ............................. 585/511, 513, 585/514; 526/139, 105

[56] References Cited

U.S. PATENT DOCUMENTS 5,480,852  1/1996  Mueller et al. ..................... 502/210

*Primary Examiner*—Asok Pal
*Assistant Examiner*—Bekir L. Yildirim
*Attorney, Agent, or Firm*—Keil & Weinkauf

[57] ABSTRACT

A novel Phillips catalyst for the copolymerization of ethylene with α-olefins, contains, as a catalytically active component, a finely divided, aluminum silicate-supported, phosphorus-containing chromium catalyst. This can be prepared by applying at least one organic phosphorus(III), (IV) and/or (V) compound and at least one chromium(III) compound which does not react with said phosphorus compounds under the reaction conditions used, in succcession in any order or simultaneously, to a finely divided aluminum silicate hydrogel or xerogel with formation of a catalyst intermediate and activating the catalyst intermediate at elevated temperatures in an oxidizing atmosphere, with the result that the chromium catalyst is formed. The novel Phillips catalyst gives ethylene/α-olefin copolymers in which the comonomers are more uniformly distributed over the copolymer chains than is the case with ethylene/α-olefin copolymers which have been prepared with the aid of conventional Phillips catalysts. Moldings which have been produced from the ethylene/α-olefin copolymers obtained in the novel procedure have a particularly high environmental stress cracking resistance and an excellent creep rupture strength.

3 Claims, No Drawings

PHILLIPS CATALYST AND ITS USE FOR THE PREPARATION OF ETHYLENE/α-OLEFIN COPOLYMERS

This is a division of application Ser. No. 08/247,479, filed May 23, 1994 U.S. Pat. No. 5,480,852 which is a FWC of Ser. No. 08/016,529, filed Feb. 11, 1993, abandoned.

The present invention relates to a novel Phillips catalyst for the copolymerization of ethylene with α-olefins, which contains, as a catalytically active component, a finely divided, aluminum silicate-supported, phosphorus-containing chromium catalyst.

Supported chromium catalysts are the essential part of the catalytically active components of the Phillips catalysts, such as those which are known to be used for the copolymerization of ethylene and α-olefins by the suspension polymerization method. In addition to silica gel and aluminum phosphate, alumina/silica cogels or aluminum silicate gels are also used as carriers in the chromium catalysts (cf. U.S. Pat. No. 2,825,721, U.S. Pat. No. 2,930,789 or DE-A-24 55 535). In the preparation of the chromium catalysts, phosphorus compounds can also be applied to the finely divided aluminum silicate gels, in addition to chromium. Phosphoric acid (cf. U.S. Pat. No. 2,945,015) or organophosphorus compounds, such as alkyl phosphates (cf. DE-A-25 02 940) are usually used for this purpose. These phosphorus compounds can react under the conditions used in the preparation of the catalyst intermediates with the chromium trioxide usually employed to give chromium- and phosphorus-containing compounds, which are finally applied to the aluminum silicate gels. However, Phillips catalysts which contain these known chromium catalysts as catalytically active components have only a low productivity, making it necessary to wash the catalyst residues out of the polymers obtained. Furthermore, the use of the carcinogenic chromium trioxide in the preparation of these Phillips catalysts is a serious disadvantage.

Other known Phillips catalysts are those which contain finely divided, silicate-supported, phosphorus-containing chromium catalysts, in whose preparation the silicate gel or the phosphorus- and chromium-containing catalyst intermediate is treated with organoaluminum compounds (cf. DE-A-28 20 860 or DE-A-26 10 422). The relevant Phillips catalysts give polymers having high melt flow indices, but their productivity is still very unsatisfactory.

The Phillips catalyst disclosed in EP-A-0 264 895 brought some progress. This Phillips catalyst gives, in high yields, ethylene homopolymers and copolymers which furthermore exhibit good processibility. In the preparation of the relevant chromium catalysts, however, organic phosphorus compounds and the reaction products of chromium(III)-acetylacetonato complexes with organoaluminum compounds are applied to silicate gels, and the resulting Phillips catalysts are furthermore activated in a conventional manner with mixtures of organolithium and organoboron compounds.

However, the environmental stress cracking resistance (ESCR) of moldings of ethylene homopolymers and copolymers which have been produced in a conventional manner still does not meet all market requirements. This applies in particular to relevant small hollow articles and canisters, since in practice they are often filled with liquids which are wet and hence cause stress cracking. Moreover, the creep rupture behavior or the creep rupture strength of pipes which are under internal pressure and consist of these ethylene homopolymers and copolymers obtained in a conventional manner is not completely satisfactory.

The structural parameter which essentially determines the environmental stress cracking resistance (ESCR) and the creep rupture strength of the moldings of ethylene copolymers is the number of short-chain branches. A large number of such branches has an advantageous effect on these performance characteristics. However, this is achieved at the expense of a reduction in the density and a loss of rigidity. Hence, improving the ESCR and the creep rupture strength by an increasing number of short-chain branches in the ethylene copolymers is possible only to a very limited extent.

According to R. Hayes and W. Webster, Plastics Institute Transactions, 32 (1964), 219 et seq., the ESCR and the creep rupture strength can also be improved by optimized, more uniform incorporation of the comonomers in the ethylene copolymers. Thus, ethylene copolymers have a comparatively high environmental stress cracking resistance and a relatively good creep rupture strength if their high molecular weight fraction has a particularly high concentration of short-chain branches, ie. a high comonomer content.

However, the comonomers are preferably incorporated in the low molecular weight fractions of the ethylene copolymers by the Phillips catalysts known to date, leading to the abovementioned disadvantages. These disadvantages can be overcome to a certain extent by fluoridizing the Phillips catalysts with compounds such as ammonium hexafluorosilicate (cf. U.S. Pat. Nos. 3,509,116 and 4,011,382). As stated by F. J. Karol in Proceedings of the International Symposium on Transition Metal Catalyzed Polymerization (1986), Editor: R. P. Quirk, Cambridge University Press, Cambridge, UK, page 702 et seq., 1988, the ethylene copolymers obtainable with the aid of the fluoridized Phillips catalysts have a more uniform comonomer distribution but also have a narrower molecular weight distribution. This narrower molecular weight distribution results in a decrease in the ESCR and a deterioration in the creep rupture strength compared with ethylene copolymers of identical melt flow index but broader molecular weight distribution.

It is an object of the present invention to provide a novel Phillips catalyst which no longer has the disadvantages of the prior art and gives, in high yields, ethylene/α-olefin copolymers which can be processed to give moldings, such as small hollow articles, canisters or pipes, having high environmental stress cracking resistance (ESCR) and creep rupture strength.

We have found that this object is achieved effectively and elegantly according to the invention if organic phosphorus(III), (IV) and (V) compounds and chromium(III) compounds are applied to a conventional aluminum silicate hydrogel or xerogel, the chromium(III) compounds and the organic phosphorus compounds not reacting with one another under the reactive conditions used in the preparation of the catalyst intermediate. In view of the prior art, it was not to be expected that the objectives set, in particular the improvement of the ESCR and of the creep rupture strength of ethylene/α-olefin copolymers, could be achieved with the aid of this measure.

The present invention accordingly relates to a novel Phillips catalyst for the copolymerization of ethylene with α-olefins, containing, as a catalytically active component, a finely divided, aluminum silicate-supported, phosphorus-containing chromium catalyst which can be prepared by (1) applying at least one organic phosphorus(III), (IV) and/or (V) compound and at least one chromium(III) compound which does not react with said phosphorus compounds under the reaction conditions used, in succession in any order or simultaneously, to a finely divided aluminum silicate hydrogel or xerogel with formation of a catalyst intermediate and (2) activating the catalyst intermediate at elevated temperatures in an oxidizing atmosphere, with the result that the chromium catalyst is formed.

For the sake of brevity, the novel Phillips catalyst for the copolymerization of ethylene with α-olefins is referred to below as the novel Phillips catalyst.

That catalytically active component of the novel Phillips catalyst which is essential according to the invention is the novel, finely divided, aluminum silicate-supported, phosphorus-containing chromium catalyst, which can be prepared by applying organic phosphorus compounds and chromium compounds to a conventional finely divided aluminum silicate hydrogel or xerogel and by activating the resulting catalyst intermediate at elevated temperatures in an oxidizing atmosphere.

For the novel Phillips catalyst, however, it is essential that the preparation of the chromium catalyst is carried out using at least one chromium(III) compound which, under the reaction conditions used in the preparation of the catalyst intermediate, does not react with the particular organic phosphorus(III), (IV) and/or (V) compounds used. Examples of suitable chromium(III) compounds which meet these requirements are water-soluble salts of trivalent chromium and chromium(III) chelate complexes. Examples of suitable water-soluble salts of trivalent chromium are chromium(III) nitrate and acetate, of which chromium(III) nitrate is very particularly advantageous and is very particularly preferably used for the preparation of the chromium catalysts. Examples of suitable chromium(III) chelate complexes are the acetylacetonato complexes of the general formula I

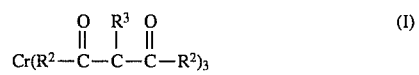

where $R^2$ is $C_1$-$C_{12}$-alkyl and $R^3$ is hydrogen or a radical $R^2$. An example of a particularly suitable chromium(III) acetylacetonato complex is trisacetylacetonatochromium(III), which is very particularly advantageous and is very particularly preferably used for the preparation of the chromium catalysts.

For the novel Phillips catalyst, it is furthermore essential that organic phosphorus(III), (IV) and/or (V) compounds are used in the preparation of the chromium catalyst. All organic phosphorus compounds which have the relevant oxidation states and do not react with the abovementioned chromium(III) compounds under the conditions which prevail in the preparation of the catalyst intermediate are suitable here.

The organic phosphorus(III) compounds are advantageously phosphites. Examples of suitable phosphites are the mono-, di- and trialkyl phosphites, the mono-, di- and triaryl phosphites and the mixed alkyl aryl phosphites.

The organic phosphorus(IV) compounds are advantageously phosphonates. Examples of suitable phosphonates are the mono- and dialkyl esters and the mono- and diaryl esters of the aryl- and alkylphosphonic acids, as well as the aryl alkyl esters of these acids.

The organic phosphorus(V) compounds are advantageously phosphates. Examples of suitable phosphates are the mono-, di- and trialkyl phosphates, the mono-, di- and triaryl phosphates and the mixed alkyl aryl phosphates.

Examples of suitable phosphorus compounds of the abovementioned type are triethyl phosphite, triphenyl phosphite, dimethyl and diethyl methanephosphonate, dimethyl ethanephosphonate, diphenyl methanephosphonate, dimethyl and diphenyl benzenephosphonate, triphenyl phosphate and triethyl phosphate, among which triethyl phosphate is very particularly advantageous and is therefore very particularly preferably used for the preparation of the chromium catalysts.

For the novel Phillips catalyst, it is furthermore essential that a finely divided aluminum silicate hydrogel or xerogel is used in the preparation of the chromium catalyst to be used according to the invention. Here, finely divided is to be understood as meaning a particle size of from 1 to 2000 μm. Aluminum silicate hydrogels and xerogels, their preparation and their use are disclosed in DE-A-24 55 535, DE-A-29 45 015, U.S. Pat. No. 2,852,721 and EP-A-0 046 897. These gels are usually prepared by neutralizing acidic waterglass solutions containing aluminum ions. The neutralization is carried out in general in such a way that a hydrogel is formed. This can be dried by azeotropic distillation or by washing out with a volatile, water-miscible solvent. However, conventional and known methods, for example spray drying or oven drying, may also be used. Drying results in a xerogel, which forms the carrier of the chromium catalyst.

It is known that silicon, iron and/or boron compounds can be incorporated in this xerogel during its preparation by coprecipitation. The abovementioned phosphorus compounds can also be added.

In terms of the method, the application of the chromium and phosphorus compounds to be used according to the invention to the finely divided aluminum silicate hydrogel or xerogel, ie. the preparation of the catalyst intermediate, has no special features but can be carried out in a conventional and known manner by suspending the gel in an organic solvent and adding the chromium and phosphorus compounds. Here, the chromium and phosphorus compounds can be applied separately from one another in any order or simultaneously. If the chromium and phosphorus compounds to be used according to the invention are solid substances, they are dissolved in suitable solvents for application. The choice of the solvent depends very simply on the solubility properties of the relevant organic phosphorus compounds on the one hand and of the chromium(III) compounds on the other hand: if, for example, the organic phosphorus compounds used are not soluble in water or mixtures of water and polar organic solvents, they are applied to the hydrogels and xerogels separately from the water-soluble chromium(III) compounds, from organic solvents. The skilled worker can therefore select the suitable solvents and the most advantageous procedure very simply on the basis of the known solubility properties of the organic phosphorus and chromium(III) compounds. If, on the other hand, the chromium and phosphorus compounds are liquid, the use of a solvent can be dispensed with.

In general, the components described above are mixed with one another at room temperature in the course of from 10 to 120 minutes. Thereafter, the suspending agent is distilled off in the course of from 2 to 10 hours, resulting in the catalyst intermediate.

In the preparation of the catalyst intermediate, the abovementioned chromium(III) compounds and the organic phosphorus compounds are used in ratios such that the resulting atomic ratio of chromium to phosphorus in the prepared chromium catalyst is from 20:1 to 1:20. In general, it is not advisable to choose other atomic ratios because this has an adverse effect on the catalytic activity of the chromium catalyst. It is particularly advantageous for the chromium catalyst to adjust the ratios of chromium(III) compounds to organic phosphorus compounds in the preparation of the catalyst intermediate so that the resulting atomic ratio of chromium to phosphorus in the prepared chromium catalyst is from 6:1 to 1:6. Novel Phillips catalysts which have chromium catalysts possessing such a chromium:phosphorus ratio as catalytically active components give ethylene/α-olefin copolymers having a particularly advantageous property profile.

Regardless of the method used for preparing the catalyst intermediate, the amounts of chromium(III) compounds and organic phosphorus compounds to be used according to the invention are chosen so that the prepared chromium catalyst contains from 0.01 to 5% by weight of chromium and from 0.01 to 5% by weight of phosphorus. If less than 0.01% by weight of phosphorus or chromium is used, the catalytic activity of the relevant Phillips catalyst is very unsatisfactory. On the other hand, the comparatively small further increase in the catalytic activity does not justify increasing the contents above 5% by weight of chromium and 5% by weight of phosphorus. Accordingly, the weight ranges of from 0.01 to 5% by weight each for chromium and phosphorus are optimum ranges within which the chromium and phosphorus content of the chromium catalyst can be widely varied and can be adapted to the given technical conditions on the one hand and to the desired property profile of the ethylene/α-olefin copolymers on the other hand. Within these optimum ranges, from 0.1 to 2% by weight of chromium and from 0.1 to 3% by weight of phosphorus are particularly noteworthy because novel Phillips catalysts which contain chromium catalysts having such a chromium and phosphorus content are particularly advantageous. The novel Phillips catalysts whose chromium catalyst contains from 0.5 to 1.5% by weight of chromium and from 1 to 2% by weight of phosphorus have proven very particularly advantageous. Noteworthy among these in turn are those novel Phillips catalysts whose chromium catalyst has the abovementioned atomic ratio of chromium to phosphorus of from 6:1 to 1:6.

In the preparation of the novel Phillips catalyst, the catalyst intermediate is activated at elevated temperatures in an oxidizing atmosphere, with the result that the finely divided, aluminum silicate-supported, phosphorus-containing chromium catalyst to be used according to the invention is formed. In terms of the method, this activation step has no special features but can be carried out in a conventional and known manner by heating the catalyst intermediate to 300°–900° C., preferably from 500°–750° C. It is known that the catalyst intermediate is heated in an oxidizing atmosphere. Examples of suitable oxidizing atmospheres are pure oxygen, oxygen/noble gas mixtures and air, among which air is particularly preferably used for economic reasons. In general, the activation time is from 30 minutes to 24 hours, a duration of from 1 to 10 hours being advantageous.

Before its use, the chromium catalyst may furthermore be reduced by ethylene and/or α-olefins, carbon monoxide or triethylborane or modified by fluoridizing or silylation.

The novel Phillips catalyst is very suitable for the preparation of copolymers of ethylene with α-olefins by the Phillips process. Suitable polymerization reactors here are the conventional and known loop reactors, autoclaves, gas phase reactors with stirrers and gasphase fluidized-bed reactors.

Examples of suitable α-olefins which can be copolymerized with ethylene are prop-1-ene, but-1-ene, pent-1-ene, hex-1-ene and oct-1-ene and the conjugated and nonconjugated diolefins, butadiene, penta-1,3-diene, 2,3-dimethylbutadiene, penta-1,4-diene, hexa-1,5-diene and vinylcyclohexene. In general, the comonomers are added to the ethylene in an amount such that ethylene copolymers consisting of from 96 to 99.8% by weight of polymerized ethylene and from 0.2 to 4% by weight of at least one polymerized comonomer are formed.

The novel Phillips catalyst has particular unexpected advantages. For example, it is sensitive to the regulating effect of hydrogen. It is very suitable for the copolymerization of ethylene by the conventional and known particle-form process in a suspension of a saturated hydrocarbon, ethylene and comonomers under from 20 to 50, in particular 40, bar and at from 90° to 110° C. Here, it has high productivity and gives ethylene/α-olefin copolymers having excellent morphology, good processibility and high toughness. However, the ethylene/α-olefin copolymers prepared by the novel procedure are especially suitable for the production of small hollow articles, plastic fuel tanks or pipes having high environmental stress cracking resistance (ESCR), good creep rupture strength and good impact strength.

EXAMPLE AND COMPARATIVE EXPERIMENT

Example

The Preparation of a Novel Phillips Catalyst and Its Use for the Preparation of an Ethylene/α-olefin Copolymer In a 2 l glass flask, 200 g of a finely divided aluminum silicate xerogel (aluminum cogel No. 6 from Grace, Worms, was used) were dispersed in 0.8 l of methanol under nitrogen. 13.5 g of trisacetylacetonatochromium(III) and 12 g of triethyl phosphate were added to this suspension. The use of these amounts of chromium compound and phosphorus compound resulted in a content of 1% by weight of chromium and 1% by weight of phosphorus in the prepared chromium catalyst. Stirring was carried out for 30 minutes, after which the suspending agent was removed in a rotary evaporator. The resulting catalyst intermediate was a grayish red, free-flowing powder. This was activated in an air stream at 600° C. in the course of 2 hours in a fluidized-bed activator. The resulting chromium catalyst had a chromium and phosphorus content of 1% by weight each, determined by elemental analysis. Immediately after its activation, it was used for the copolymerization of ethylene with hex-1-ene. For this purpose, a 10 l pressure autoclave having a stirrer was heated to 95° C. and was flushed with dry nitrogen for 10 minutes. Thereafter, 100 ml of hex-1-ene and 5 l of isobutane were fed into the pressure autoclave. A total pressure of 40 bar was then established in the autoclave with ethylene. The copolymerization was initiated and maintained by introducing a total of 500 mg of the chromium catalyst with the aid of a lock. After polymerization for 20 minutes at 95°±2° C., the pressure in the autoclave was let down with evaporation of the isobutane and of the unconverted monomers, and the resulting polymer was removed.

The copolymerization was repeated four times, the reactions being terminated after 30, 40, 50 or 60 minutes.

The productivity of the novel Phillips catalyst as well as the limiting viscosity number $J_g$ ($cm^3/g$), the melt flow index HLMI (g/10 min) and the hexene content of the resulting copolymers were determined for each experiment. As a result, the dependence of these parameters on the copolymerization time was simultaneously determined. The values obtained are compared with the relevant values of the Comparative Experiment in Table 1. The comparison shows that the novel Phillips catalyst incorporated the α-olefin in the ethylene/α-olefin copolymers much more independently of the copolymerization time than the conventional Phillips catalyst. This resulted in an ethylene/hex-1-ene copolymer in which the hex-1-ene was incorporated uniformly, ie. much more independently of the molecular weight than was the case for the ethylene/hex-1-ene copolymer of the Comparative Experiment, prepared in a conventional manner.

This is also confirmed by the fractionation, according to Holtrup (cf. Makromol. Chemie 178 (1977), 2335–2349), of the ethylene/hex-1-ene copolymers of the Example and of the Comparative Experiment, obtained after copolymerization for 60 minutes. The relevant values are shown in Table 2.

COMPARATIVE EXPERIMENT

The Preparation of a Known Phillips Catalyst and Its Use for the Preparation of an Ethylene/Hex-1-ene Copolymer The Example was repeated, except that silica gel T-195 from BASF was used instead of the aluminum silicate xerogel and no triethyl phosphate was added. The resulting known Phillips catalyst having a pale green color was used instead of the novel Phillips catalyst of the Example for the copolymerization.

The results of the experiment are shown in Table 1 and the results of the fractionation according to Holtrup are shown in Table 2.

TABLE 1

The preparation of ethylene/hex-1-ene copolymers with the aid of the novel (Example) and a known (Comparative Experiment) Phillips catalyst and properties of the resulting products and their dependence on the copolymerization time

| Productivity and product properties | Copolymerization time (min) | 20 | 30 | 40 | 50 | 60 |
|---|---|---|---|---|---|---|
| Productivity (g/g)[a]: | Example | 375 | 800 | 990 | 1600 | 2450 |
| | [Comparative Experiment] | [890] | [990] | [1450] | [2100] | [3600] |
| $J_g$ (cm$^3$/g)[b]: | Example | 420 | 430 | 430 | 440 | 460 |
| | [Comparative Experiment] | [360] | [350] | [430] | [450] | [490] |
| HLMI (g/10 min)[c]: | Example | 6.0 | 4.4 | 2.9 | 2.2 | 1.6 |
| | [Comparative Experiment] | [10] | [9.6] | [3.6] | [1.6] | [1.0] |
| Hex-1-ene (mol %)[d]: | Example | 1.21 | 0.97 | 0.94 | 0.92 | 0.91 |
| | [Comparative Experiment] | [1.93] | [1.66] | [1.46] | [1.31] | [1.04] |

[a] g of copolymer per g of catalyst
[b] Limiting viscosity number, measured according to DIN 53,733
[c] High load melt flow index, determined according to DIN 53,735 at 190° C. and under an applied force of 21.6 kp
[d] Hex-1-ene content, measured with the aid of $^{13}C$ nuclear magnetic resonance spectroscopy

TABLE 2

The fractionation, according to Holtrup, of the ethylene/hex-1-ene copolymers of the Example and of the Comparative Experiment (copolymerization time in each case: 60 min)

| Example | | Comparative Experiment | |
|---|---|---|---|
| Limiting viscosity No. $J_g$[a] (cm$^3$/g) | Hex-1-ene content[b] (mol %) | Limiting viscosity No. $J_g$[a] (cm$^3$/g) | Hex-1-ene content[b] (mol %) |
| 50 | 1.12 | 30 | 1.78 |
| 80 | 0.99 | 40 | 1.49 |
| 140 | 0.97 | 120 | 1.44 |
| 220 | 0.94 | 240 | 1.34 |
| 660 | 0.92 | 580 | 0.99 |
| 780 | 0.89 | 910 | 0.65 |

[a] Determined according to DIN 53,733
[b] Measured with the aid of $^{13}C$ nuclear magnetic resonance spectroscopy

We claim:

1. A process for the preparation of a copolymer of ethylene with α-olefins which comprises: copolymerizing ethylene with α-olefins in the presence of a finely divided, aluminum silicate-supported, phosphorous containing chromium Phillips catalyst prepared by (1) applying at least one organic phosphorus compound selected from the group consisting of phosphates, phosphonates and phosphites and at least one chromium (III) compound which does not react with said phosphorus compounds under the reaction conditions used, in succession in any order or simultaneously, to a finely divided aluminum silicate hydrogel or xerogel to form a catalyst intermediate and (2) activating the catalyst intermediate by heating the intermediate in an oxidizing atmosphere.

2. The process of claim 1, wherein copolymerization is effected in the presence of hydrogen.

3. An ethylene/α-olefin copolymer which is prepared by the process of claim 1.

* * * * *